(12) United States Patent
Jia (10) Patent No.: US 6,934,055 B2
(45) Date of Patent: Aug. 23, 2005

(54) METHOD OF ADJUSTING GRAY SCALE RESPONSE TO MORE CLOSELY CORRELATE SCANNER BASED IMAGE ANALYSIS SYSTEMS

(75) Inventor: Jianchu Jia, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 251 days.

(21) Appl. No.: 10/255,550

(22) Filed: Sep. 26, 2002

(65) Prior Publication Data

US 2004/0062438 A1 Apr. 1, 2004

(51) Int. Cl.$^7$ .......................... H04N 1/40; H04N 1/407; H04N 1/04
(52) U.S. Cl. ..................... 358/1.9; 358/406; 358/474
(58) Field of Search .................. 358/1.9, 3.01, 358/504, 505, 515, 518, 519, 474, 494, 406

(56) References Cited

U.S. PATENT DOCUMENTS

| | | | |
|---|---|---|---|
| 5,258,925 A | | 11/1993 | Maier et al. |
| 5,339,176 A | * | 8/1994 | Smilansky et al. ......... 358/504 |
| 5,420,979 A | * | 5/1995 | Madden et al. ............. 345/501 |
| 6,057,929 A | | 5/2000 | Walker |
| 6,266,155 B1 | | 7/2001 | Lee et al. |
| 2002/0196476 A1 | * | 12/2002 | Ozaki ........................ 358/406 |
| 2003/0038973 A1 | * | 2/2003 | Lee ........................... 358/3.01 |

FOREIGN PATENT DOCUMENTS

WO    WO9201264    1/1992

OTHER PUBLICATIONS

Written Opinion of International Preliminary Examining Authority, Jul. 8, 2004.
International Search Report, Jan. 7, 2004.
Image Analysis Standardization, Charles S. Moss, vol. 76, No. 10 Tappi Journal, pp. 117–122.
Abstract, 9$^{th}$ PTS–CTP Deinking Symposium, Munich, Germany, May 9–11, 2000, 12 pp.
Basic Guidelines for Image Analysis Measurements, TIP 0804–09, Tappi, Issued 2001.

* cited by examiner

Primary Examiner—Scott A. Rogers
(74) Attorney, Agent, or Firm—Dority & Manning, P.A.

(57) ABSTRACT

The present invention provides for a method of adjusting the gray scale response of a first scanner and a second scanner so that the two gray scale responses more closely match one another. The method includes the step of providing a first scanner that has a gray scale response upon scanning a target. Also, a second scanner is provided that has a gray scale response upon scanning the target that is adjustable. The gray scale response of the first scanner is measured upon the scanning of the target. Also, the gray scale response of the second scanner is measured upon scanning the target. Additionally, the gray scale response of the second scanner is adjusted in order to more closely match the gray scale response of the first scanner.

21 Claims, 12 Drawing Sheets

| Gray Scale Step | R% | HP® 210PG | HP® 21034 | HP® 46213 | HP® 2109Q | HP® 85532 | HP® 2103R | HP® 6100 |
|---|---|---|---|---|---|---|---|---|
| 1 | 0.5 | 6 | 3 | 2 | 6 | 3 | 2 | 5 |
| 2 | 3.3 | 10 | 9 | 7 | 10 | 8 | 8 | 9 |
| 3 | 6.6 | 19 | 17 | 16 | 18 | 17 | 17 | 18 |
| 4 | 12 | 32 | 31 | 30 | 31 | 30 | 30 | 32 |
| 5 | 25.4 | 50 | 49 | 49 | 49 | 48 | 49 | 51 |
| 6 | 30 | 74 | 73 | 73 | 74 | 72 | 74 | 77 |
| 7 | 42.5 | 104 | 103 | 104 | 104 | 101 | 104 | 108 |
| 8 | 59.5 | 142 | 141 | 143 | 141 | 138 | 143 | 149 |
| 9 | 79.3 | 194 | 193 | 194 | 193 | 187 | 195 | 205 |
| 10 | 88.2 | 220 | 219 | 218 | 219 | 211 | 220 | 232 |

FIG.8

| Modes from Seven HP® ScanJet® Scanners | |
|---|---|
| Mean | Std |
| 4 | 2 |
| 9 | 1 |
| 17 | 1 |
| 31 | 1 |
| 49 | 1 |
| 74 | 2 |
| 104 | 2 |
| 142 | 3 |
| 194 | 5 |
| 220 | 6 |

FIG.9

| HP®ScanJet® Mean | PowerLook®III factory default | PowerLook®III Setting-1 | PowerLook®III Setting-2 |
|---|---|---|---|
| n/a | Gamma=1.5 | Gamma=1.0 | Gamma=1.0, range transform |
| 4 | 1 | 0 | 5 |
| 9 | 9 | 6 | 10 |
| 17 | 18 | 15 | 17 |
| 31 | 34 | 28 | 27 |
| 49 | 57 | 47 | 44 |
| 74 | 89 | 73 | 66 |
| 104 | 131 | 108 | 95 |
| 142 | 189 | 155 | 136 |
| 194 | 255 | 225 | 195 |
| 220 | 255 | 255 | 222 |

FIG.10

| HP®ScanJet® | PowerLook®III factory default | PowerLook®III Setting-1 | PowerLook®III Setting-2 |
|---|---|---|---|
| n/a Mean of Modes | Gamma=1.5 Deltas of Modes | Gamma=1.0 Deltas of Modes | Gamma=1.0 and range transform Deltas of Modes |
| 4 | 2.9 | 3.9 | 1.1 |
| 9 | 0.3 | 2.7 | 1.3 |
| 17 | 0.6 | 2.4 | 0.4 |
| 31 | 3.1 | 2.9 | 3.9 |
| 49 | 7.7 | 2.3 | 5.3 |
| 74 | 15.1 | 0.9 | 7.9 |
| 104 | 27.0 | 4.0 | 9.0 |
| 142 | 46.6 | 12.6 | 6.4 |
| 194 | 60.6 | 30.6 | 0.6 |
| 220 | 35.1 | 35.1 | 2.1 |
| | | | |
| Sum | 199.0 | 97.3 | 38.0 |

| Sample ID | Mean ppm | $S_R$ | Relative $S_R$ % |
|---|---|---|---|
| C1 | 6578 | 1354 | 20.6 |
| C2 | 7924 | 1574 | 19.9 |
| E1 | 1062 | 107 | 10.1 |
| E2 | 799 | 99 | 12.4 |
| Towel | 97.6 | 9.9 | 10.1 |
| Tissue | 53.6 | 7.7 | 14.4 |

FIG.13

| Sample ID | Seven Hp® ScanJet® Mean | PowerLook®III #1 Setting 2 | PowerLook®III #2 Setting 2 | PowerLook®III #3 Setting 2 | UMAX®-2400 n/a |
|---|---|---|---|---|---|
| C1 | 6578 | 7578 | 8519 | 7878 | 12805 |
| C2 | 7924 | 9134 |  | 9600 | 15167 |
| E1 | 1062 | 1133 | 1145 | 1160 | 1387 |
| E2 | 799 | 845 |  | 903 | 1163 |
| Towel | 97.6 | 99 | 98.3 | 95.3 | 121.5 |
| Tissue | 53.6 | 50 | 51.9 | 50.8 | 55.2 |

FIG.14

| Sample ID | PowerLook®III #1 Setting 2 | PowerLook®III #2 Setting 2 | PowerLook®III #3 Setting 2 | UMAX®-2400 n/a |
|---|---|---|---|---|
| C1 | 0.55 | 2.06 | 0.92 | 21.15 |
| C2 | 0.59 |  | 1.13 | 21.18 |
| E1 | 0.44 | 0.60 | 0.84 | 9.23 |
| E2 | 0.22 |  | 1.10 | 13.52 |
| Towel | 0.02 | 0.00 | 0.05 | 5.83 |
| Tissue | 0.17 | 0.05 | 0.13 | 0.04 |
| Square-root of avg. Z score | 0.57 | 0.82 | 0.84 | 3.44 |

METHOD OF ADJUSTING GRAY SCALE RESPONSE TO MORE CLOSELY CORRELATE SCANNER BASED IMAGE ANALYSIS SYSTEMS

BACKGROUND

Scanning based technology is common in various industries. For instance, paper products are commonly made using scanning based technology. In this industry, it is common to use scanning technology in order to measure "dirt" counts in paper products such as tissue and towel products. Dirt may be residual ink or other dark specks that are present in a predominantly light colored paper product.

Figure 1:
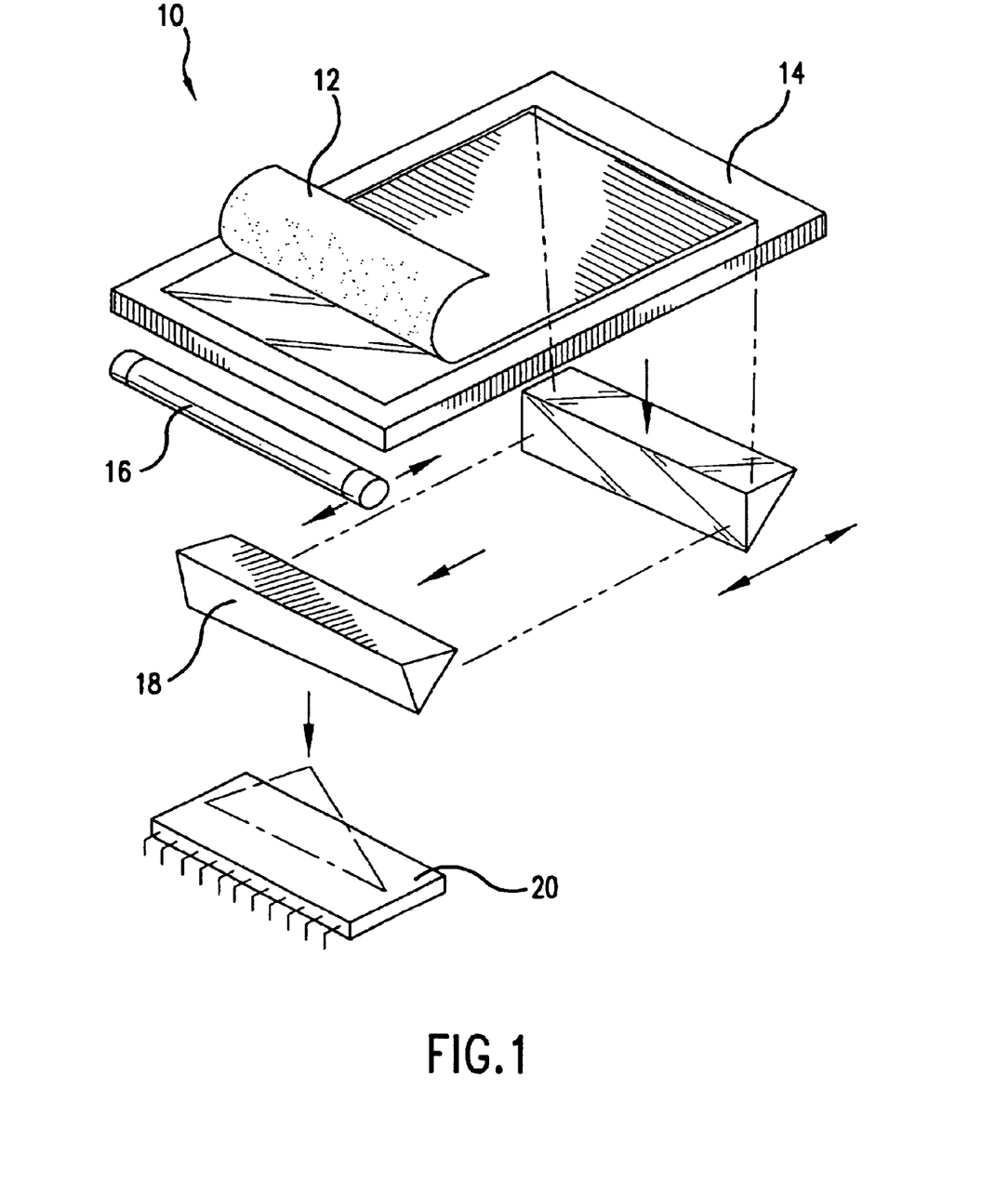
FIG. 1 is an exploded assembly view of a scanner.

Dirt count measurements typically employ a scanner to obtain raw data. As shown in FIG. 1, a scanner 10 typically has a glass scanner bed 14 located thereon. A target 12 is placed on the glass scanner bed 14, and a light 16, which is typically a bright, cold white light, is used to illuminate the target 12 that is to be scanned. The scanner 10 is typically attached to a host PC which has software that controls the resolution, color mode, scanning area, gamma factors, transform functions, etc. of the scanning process. The light 16 is usually mounted on a moving rack and moves slowly across the glass scanner bed 14. A scanning head 18 is present and consists of an array of light sensitive CCD cells that generate an electrical charge when hit by light. The brighter the light that hits a single CCD cell, the larger the electrical charge the cell will generate. The electrical charge is then converted into a gray scale number which represents the light intensity reflected by the target 12 at a particular point. Gray scale numbers are commonly known in scanning and photographic industries. However, there is no industry wide calibration as to which gray scale value is to be assigned to a target having a particular reflectivity. Typically, a zero gray scale reference number represents the absence of light, and a 255 gray scale number represents complete reflectivity. A drive 20 may be present which converts the raw data from the electrical charge or gray scale number into a format that may be displaced on an output device. Additionally, this data may be transferred into the corresponding PC or saved in a file.

Scanners on the market are primarily designed for the reproduction of photographs, and are not specifically designed as a measurement device to be used to measure the dirt count of paper products. As such, it is sometimes the case that standardization and calibration of scanners may not be possible in order to analyze the dirt count of paper products. Scanners made by different manufacturers and even scanners made by the same manufacturer may assign different gray scale numbers to the identical target 12. As such, when scanners from different manufacturers are used to measure dirt count, without proper adjustment to the scanners, the test results may be incomparable to one another. This discrepancy would cause problems in manufacturing environments that use different scanners in different lines or at different plants. The gray scale response, and hence the dirt count of the paper products, would not be consistent and hence final products of different quality would be produced.

When scanning a paper product, after the entire image of the target 12 is received by the supporting software, the software typically divides all of the pixels received into two groups based on a predetermined threshold value or detection level. Pixels are basic elements for any digital image. The gray level of the pixel may be measured along with the size of the pixel. Pixels that have the gray scale value fall below the threshold value or detection level are classified as containing dirt. Pixels whose gray scale values are higher than the threshold value or detection level are classified as being part of the background of the paper product. The physical size of dirt specks may be hard to measure due to an edge effect in which the dirt speck only partially covers one or more pixels. Therefore, it is sometimes the case that the digitized image of the dirt speck is always larger or smaller than the actual dirt speck due to the edge effect and also due to the detection level or threshold value that is set. The software may compute many values upon the scanning of the target 12. For instance, the average gray scale value may be calculated along with the parts per million (ppm) of the total dirt speck area, and the total number of dirt specks detected.

Scanners 10 may also suffer from variations in movement of the scanning head 18. Slight imprecision in the movement control of the scanning head 18 may cause for varying results when the target 12 is scanned multiple times under the same conditions. Additionally, changes in the light 16 imparted onto the target 12 during scanning may also provide variability upon results that are obtained from scanning the same target 12 multiple times.

Lighting differences can arise from sources including the intensity of the light 16, the angular incidents of the light 16, the temperature of the light 16, and variable light intensity when the scanner 10 is subjected to light variations from an ambient source.

Scanning allows for the quality control of the tissue or towel product that is created. Also, scanning allows for a process control during the manufacturing of the tissue or hand towel. For instance, if there is too much dirt present, the product may be reprocessed or may be treated with a bleaching agent or have virgin fiber blended therein in order to reduce the amount of dirt.

Although many variables are present that may account for measurement errors in the dirt count calculation of a tissue or towel product, it is still possible to achieve statistically acceptable results if dirt specks are analyzed under controlled conditions which include proper settings for the scanner 10.

The present invention seeks to improve the repeatability of dirt count measurements by adjusting the gray scale response between different types of scanners that are used in producing tissues and towel products in different manufacturing plants and/or different areas of the same manufacturing plant. The present invention may be used in the processing of recycled fiber from copy paper, printing paper and newspaper, but it is not limited to this application.

SUMMARY

Various features and advantages of the invention will be set forth in part in the following description, or may be obvious from the description, or may be learned from practice of the invention.

The present invention provides for a method of adjusting the gray scale response of a first scanner and a second scanner so that the two gray scale responses more closely match one another. The method includes providing a first scanner that has a gray scale response upon scanning a target. Also, a second scanner is provided that has an adjustable gray scale response upon scanning the target. The gray scale response of the first scanner is measured upon scanning the target, and the gray scale response of the second scanner is measured upon scanning the target. The gray scale response of the second scanner is adjusted in order to more closely match the gray scale response of the first scanner.

The present invention also includes exemplary embodiments of the method as described above where the first scanner has a factory set gray scale response that is not adjustable. A further exemplary embodiment of the method in accordance with the present invention exists in an exemplary embodiment as described above where the second scanner has a maximum dynamic range that is greater than or equal to 3.4.

Also, the present invention includes an exemplary embodiment as described above where the step of measuring the gray scale response of the first scanner includes measuring at least one mode of the gray scale response of the first scanner. Also, the step of measuring the gray scale response of the second scanner includes measuring at least one mode of the gray scale response of the second scanner.

A further exemplary embodiment of the present invention exists in a method as described above where the step of adjusting includes the adjustment of a gamma value of the second scanner so that the gray scale response of the second scanner more closely matches the gray scale response of the first scanner.

A still further exemplary embodiment of the present invention exists in a method as described above where the step of adjusting includes adjusting a range transform of the second scanner. The range transform of the second scanner is adjusted so that the gray scale response of the second scanner more closely matches the gray scale response of the first scanner.

An exemplary embodiment of the present invention exists in a method as substantially described above where a plurality of first scanners are provided. A plurality of modes of the gray scale responses of the plurality of first scanners are measured upon scanning the target. Also, a plurality of modes of the gray scale response of the second scanner is measured upon scanning the target. The mean of the plurality of modes of the gray scale responses of the plurality of first scanners is measured. Also, the gray scale response of the second scanner is adjusted in order to more closely match the gray scale responses of the plurality of first scanners. This adjustment is made so that the sum of the differences between the plurality of modes of the gray scale response of the second scanner and the mean of the plurality of modes of the gray scale responses of the plurality of first scanners is reduced after the adjustment.

DETAILED DESCRIPTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
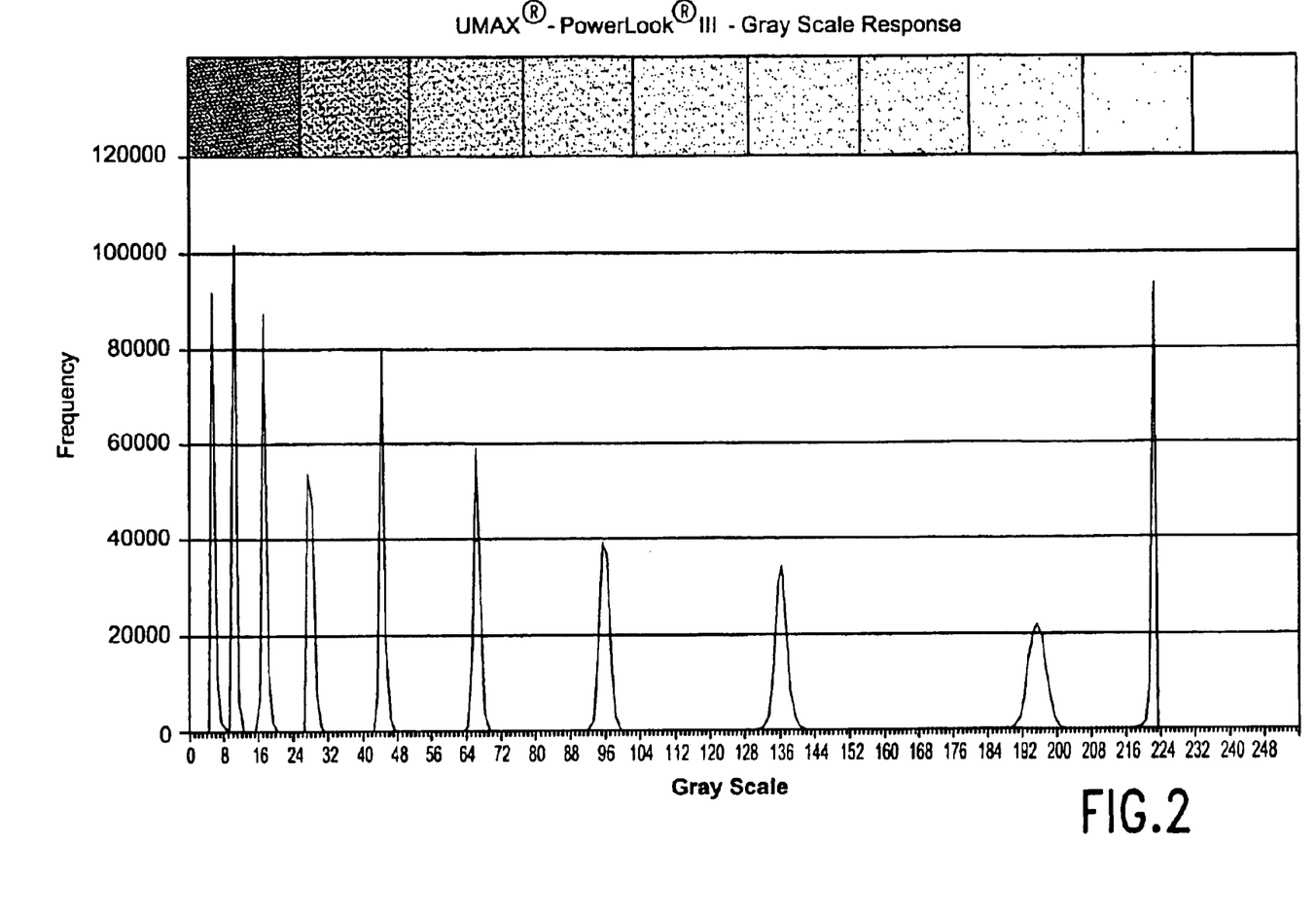
FIG. 2 is a graph of the gray scale response of a UMAX®-Power Look® III Scanner to a 10-step gray scale target.

Referring now to the figures, FIG. 2 shows the gray scale response of a UMAX®-Power Look® III Scanner. Here, the target is a 10-step gray scale target. The 10-step gray scale target may be a standard Kodak® swatch in which each step has a known value of gray level and percentage of reflectant. The 10-step gray scale target is shown at the top of FIG. 2. This 10-step gray scale target is used throughout the rest of the detailed description, however it is to be understood that in other exemplary embodiments of the present invention, targets other than a 10-step gray scale target may be used.

As shown in FIG. 2, the UMAX®-Power Look® III Scanner measures 10 distinct gray scale levels. However, due to the edge effect and other variations the actual reading of the ten groups of data as shown in FIG. 2 has a slight range with a peak value. As can be seen in FIG. 2, the UMAX®-Power Look® III Scanner assigns a gray scale response of approximately seven to a target that does not reflect light and a gray scale value of approximately 220 to a target that reflects light completely.

Figure 3:
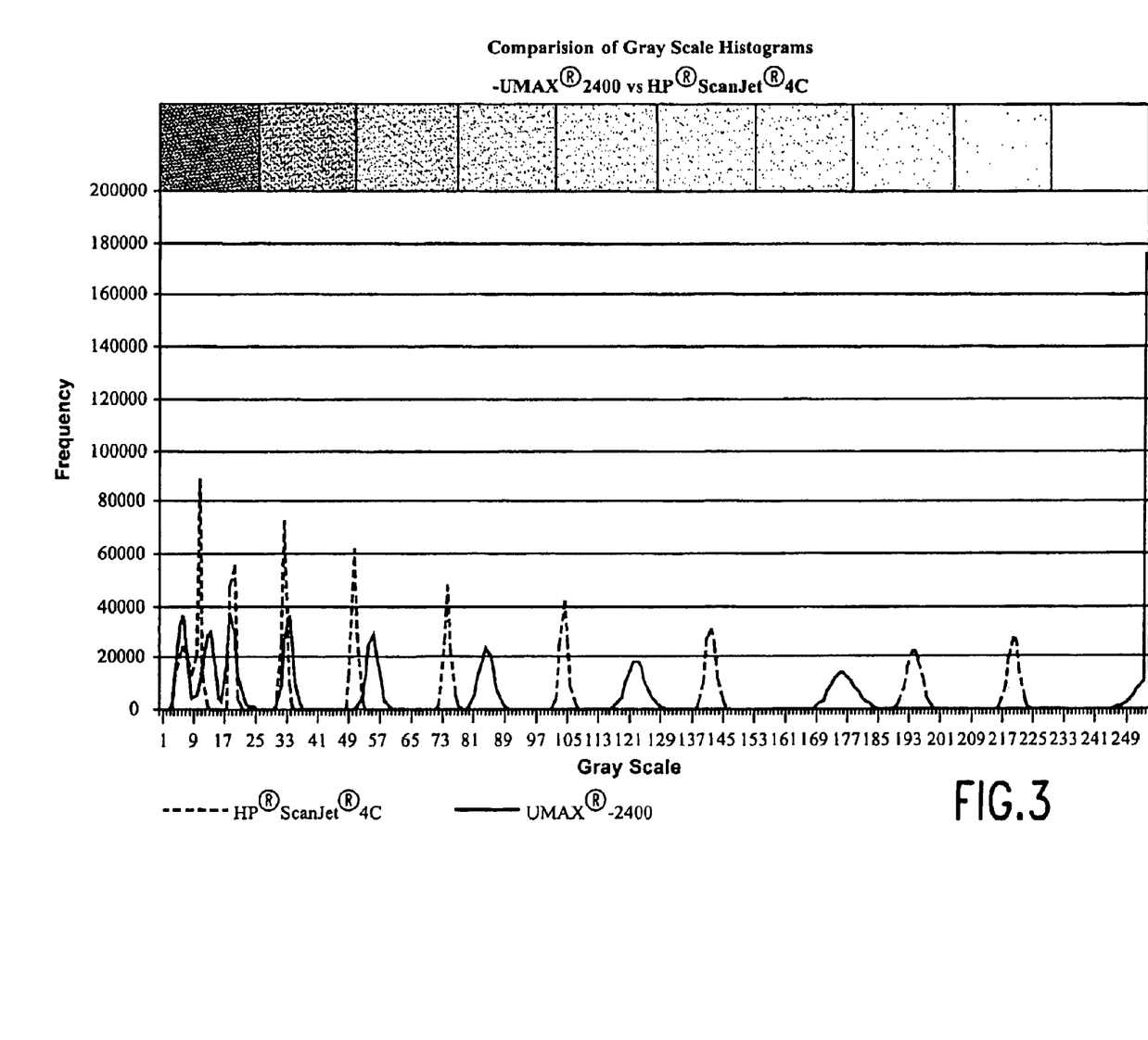
FIG. 3 is a graph of a comparison of the gray scale response between an HP® Scan Jet® 4C and a UMAX®-2400 Scanner.

FIG. 3 shows a graph of the gray scale response of an HP® Scan Jet® 4C Scanner and a UMAX®-2400 Scanner. As can again be seen, 10 groups of data are present for each scanner which represent different gray scale values for the 10 different steps of the gray scale target. Also as can be seen in FIG. 3, the two different types of scanners assign different gray scale values to the same gray scale step of the exact same target. This difference in gray scale value can be due to the variations as discussed above and/or due to the two different scanners assigning different gray scale values for the measured targets. A different amount of dirt would be detected on the target depending upon which scanner was used in scanning the target.

Figure 4:
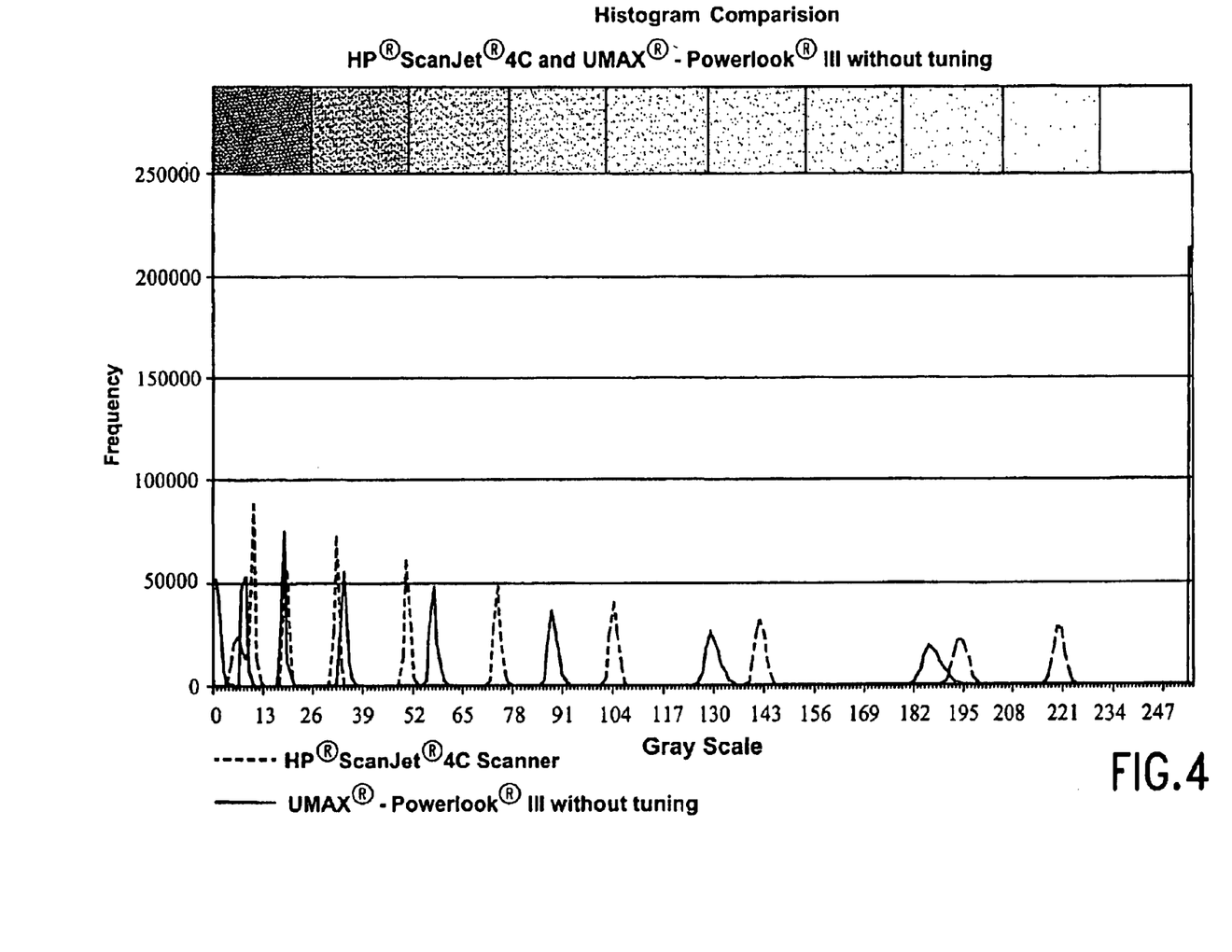
FIG. 4 is a graph of a comparison of the gray scale response between a HP® 4C Scanner and a UMAX®-Power Look® III Scanner without tuning.

FIG. 4 shows a comparison between the gray scale response of a HP® 4C Scanner and a UMAX®-Power Look® III Scanner. Again, a series of distinct groups of data may be seen for both different types of scanners in response to the scanning of a 10-step gray scale target. Also, the gray scale value assigned to each individual step of the 10-step gray scale target is different between the two types of scanners.

Certain types of scanners such as the HP® Scan Jet® series and the UMAX®-2400 Scanner have gray scale outputs that are normally not adjustable. Therefore, the dirt count measurement results from these scanners are scanner-brand dependent. In effect, the dirt count measurements measured by the UMAX®-2400 Scanner has no statistical similarity to the dirt count measurements of the HP® Scan Jet® Scanners. As mentioned, this results in part from the wide discrepancy between the gray scale responses of the two types of scanners. However, some scanner manufacturers have started to manufacture scanners and software with tuning capability that allows for a variation in the gray scale response of the scanner upon measuring a target. The UMAX®-Power Look® III Scanner is one such adjustable scanner. In effect, an adjustable scanner allows one to assign different gray scale values to a target that has the same reflectivity both before and after the adjustment.

The maximum dynamic range of a scanner is the ability of a scanner to sense the differences in the dark areas of a target. The dark areas of the target are those which are assigned lower gray scale values. The smaller the dynamical range, the less sensitive the scanner is to differences in reflectivity. If the maximum dynamic range of the scanner is high enough, the scanner may be adjusted in order to match the sensitivity of a different scanner that has a lower sensitivity. The maximum dynamic range of the UMAX®-Power Look® III Scanner is 3.4, however it is to be understood that in other exemplary embodiments of the present invention, that the maximum dynamic range of the scanner is not limited to 3.4 but may be higher or lower.

Figure 5:
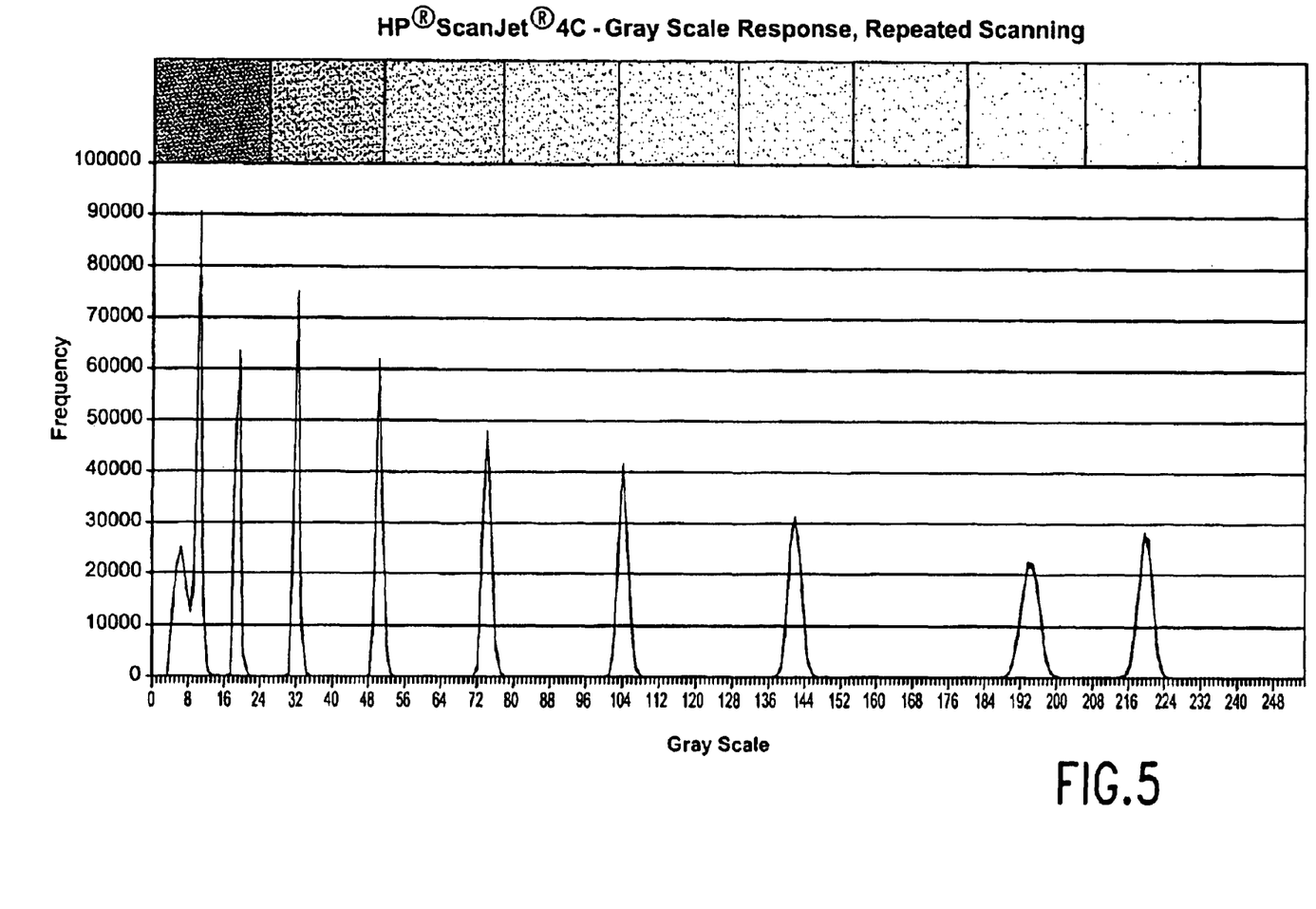
FIG. 5 is a graph of the gray scale response of an HP® Scan Jet® 4C scanner after repeated scanning of the same target.

FIG. 5 shows the gray scale response of an HP® Scan Jet® 4C Scanner upon the repeated scanning of a target. As can be seen, the individual group of data that represent the gray scale level of each individual step of the 10-step gray scale target is shown as having a range. This variability is due to the fact that the scanner may measure slightly different gray scale values upon measuring the identical target. This variation may be due to changes in the light 16 that is imparted onto the target 12 along with variation in movement of the scanning head 18.

Figure 6:
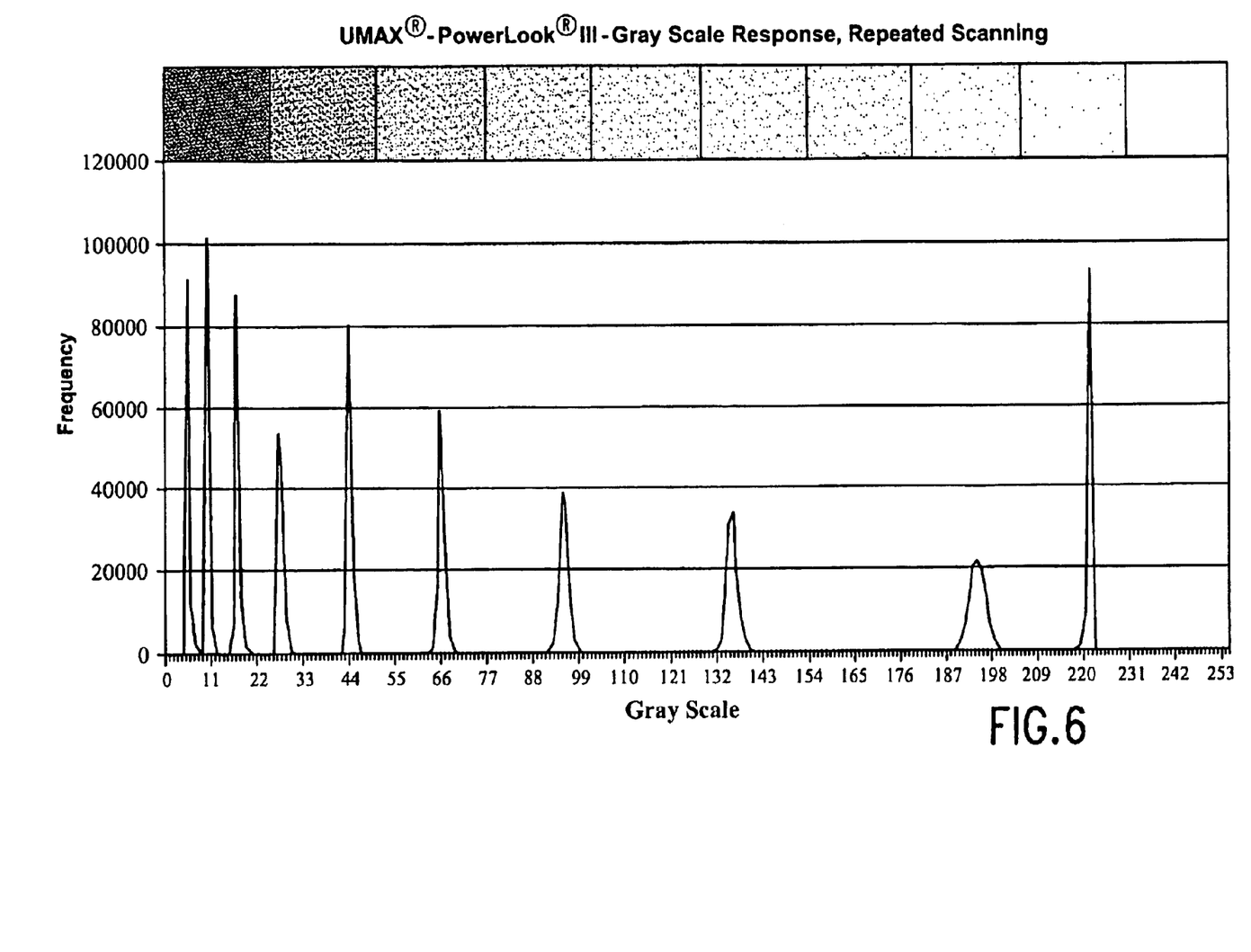
FIG. 6 is a graph of the gray scale response of a UMAX®-Power Look® III Scanner after repeated scanning of the same target.

FIG. 6 shows the gray scale response of a UMAX®-Power Look® III Scanner. Again, the values in FIG. 6 are obtained through repeated scanning of the UMAX®-Power Look® III Scanner on an identical target 12. The variability of the gray scale values is due for substantially the same reasons as discussed above with the variability in regards to the gray scale responses of the HP® Scan Jet® 4C Scanner.

Figure 7:
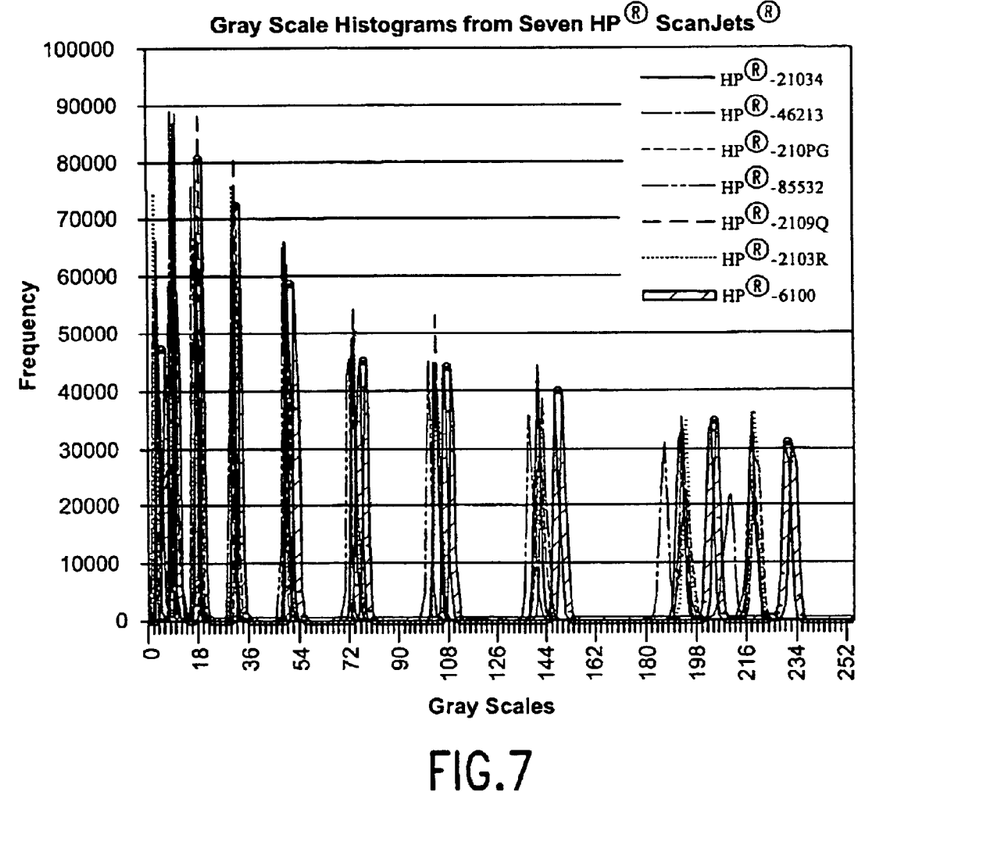
FIG. 7 is a graph of the gray scale responses of seven different HP® Scan Jet® Scanners.

FIG. 7 shows the gray scale response from seven different types of HP® Scan Jet® Scanners. The seven different types of HP® Scan Jet® Scanners are shown in the legend in FIG. 7. As can be seen, each type of scanner for the most part assigns a different gray scale value for each step of the 10-step gray scale target. These seven scanners tend to assign more variable gray scale numbers to targets having greater reflectivity.

The mean of the average gray scale value for the UMAX®-Power Look® III Scanner is 81.5. The mean of the average gray scale value for the HP® Scan Jet® 4C Scanner is 85.6. The mean of the average gray scale value for the seven HP® Scan Jet® scanners is 85.14.

Since each of the HP® Scan Jet® scanners has its own unique gray scale response to the scanning of an identical 10-step gray scale target, and the gray scale response is not adjustable, a second adjustable scanner is needed in order to more closely match its gray scale response to the HP® Scan Jet® scanners. In order to make this adjustment, it is more convenient to work with the modes of the gray scale responses as opposed to the pixels. However, in other exemplary embodiments of the present invention, the pixels may be used instead of the modes. Additionally, other responses from the first scanner and second scanner may be used in order to more closely match one of the gray scale responses to the other. As such, the present invention is not limited to analyzing the modes of the scanners. The mode may be defined as the most frequent value of a data set. The mode may also be thought of as the highest number in a group of data sets. For instance, referring to FIG. 6, it can be seen that 10 sets of data and modes are present in the gray scale response of the UMAX®-Power Look® III Scanner. As can be seen, the highest mode of the UMAX®-Power Look® III Scanner is approximately 222, and the lowest mode of the UMAX®-Power Look® III Scanner is approximately 4. For a 10-step gray scale target, 10 modes represent the 10 gray scale level readings of the scanner.

Although described as having the gray scale response being modified through an analysis of the modes, it is to be understood that analysis of other output of the scanners may be made in order to make the adjustments. For instance, the range of the gray scale response may be used in order to further adjust the scanners. As such, the present invention is not limited to simply an analysis of the modes of the scanners in order to provide for the adjustment.

Figure 8:
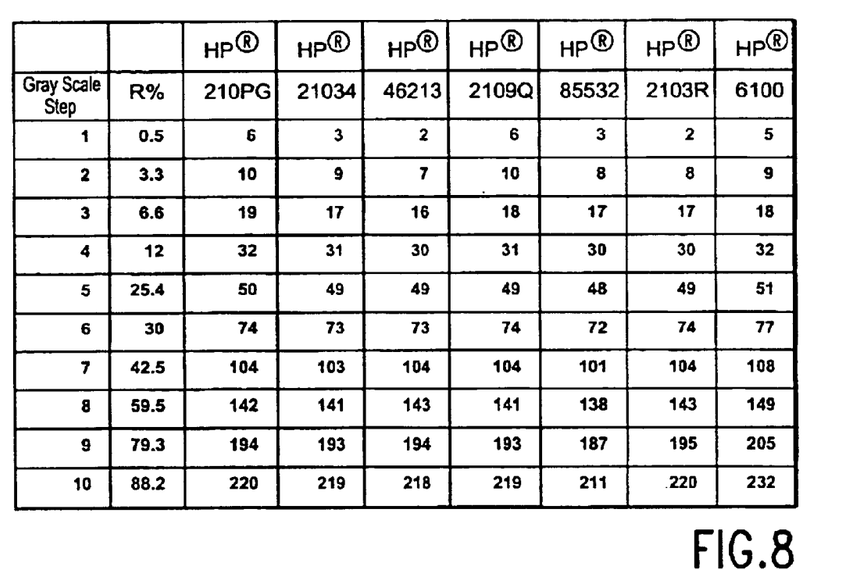
FIG. 8 is a table of the gray scale responses of seven different HP® Scan Jet® Scanners.
Figure 9:
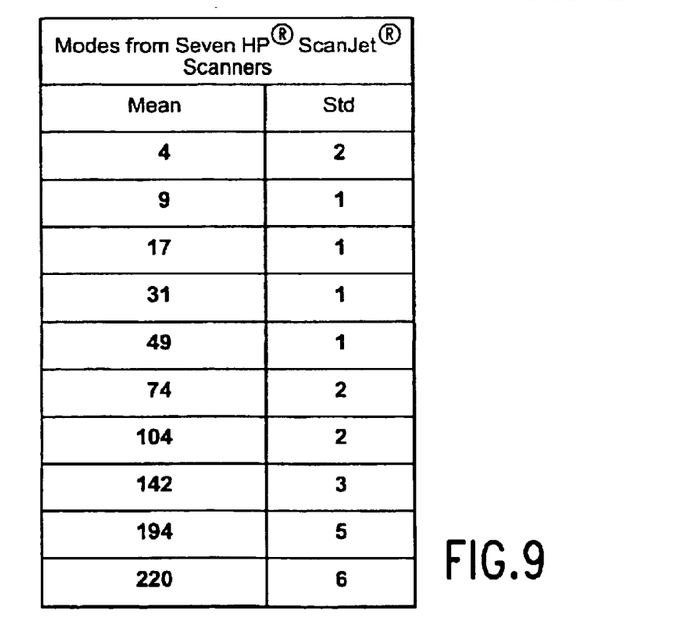
FIG. 9 is a table of the mean and standard deviations of the modes from the seven different HP® Scan Jet® Scanners of FIG. 8.

Referring now to FIG. 8, the individual modes of seven different HP® Scan Jet® scanners are listed. Also listed is the deviation in the degree of variation within the group of HP® Scan Jet® scanners. FIG. 9 is a table showing the mean of the modes of the seven HP® Scan Jet® scanners. Also shown is the standard deviation of the modes from the seven different HP® Scan Jet® scanners. In one exemplary embodiment of the present invention it is desired to adjust a second scanner so that the gray scale response of the second scanner more closely matches the mean of the modes from the seven HP® Scan Jet® scanners. However, in other exemplary embodiments of the present invention it may be desired to match the mean of the modes from any number of first scanners, those being of a number different than seven. Additionally, it may be desired to match the mode from a single first scanner as opposed a plurality of first scanners. As such, the present invention is not limited to adjusting a second scanner in order to match the mean of the modes from seven different first scanners.

The gray scale response of a second adjustable scanner may be recorded after scanning the 10-step gray scale target. One such adjustable second scanner may be a UMAX®-Power Look® III Scanner. Once again, the modes of the second scanner may be recorded and compared to the modes from the gray scale response of the first scanner. A transform function may be obtained and developed in order to minimize the differences of modes between the first and second scanners. In one exemplary embodiment of the present invention, the modes between a UMAX®-Power Look® III Scanner and the group of seven HP® Scan Jet® scanners (as recorded in FIGS. 8 and 9) are minimized.

Figure 10:
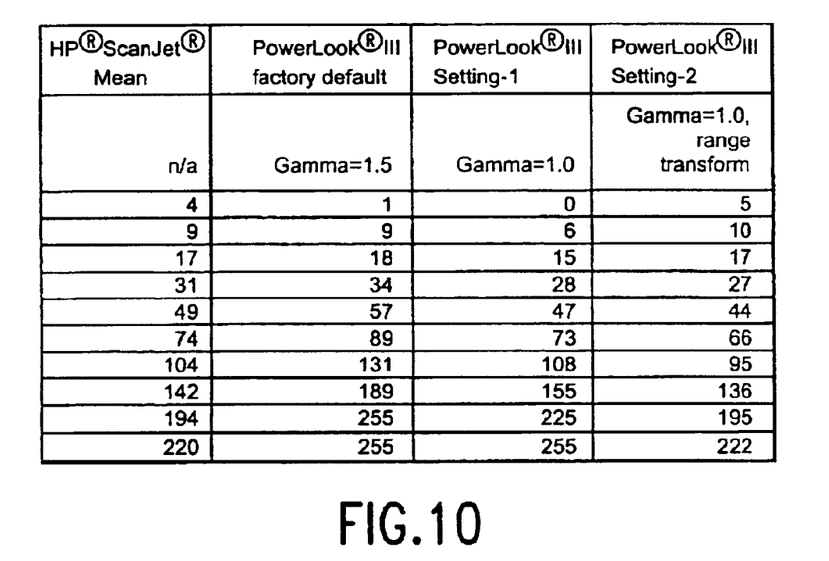
FIG. 10 is a table of the comparison of modes between the mean of several different HP® Scan Jet® Scanners and three settings of a UMAX®-Power Look® III Scanner.

The UMAX®-Power Look® III Scanner has a factory default setting of a gamma value being 1.5. A gamma curve is the shape of a line that relates the input signal and output value in video cameras, computer monitors, and color printers. The gamma value is the exponent of the function relating output to input signal. Typically, gamma values other than 1.0 will skew the input signal from the CCD sensors proportionally to the light reflectant percentage. FIG. 10 shows the gray scale response of the Power Look® III Scanner having the factory default setting of a gamma value being equal to 1.5. These gray scale response numbers are shown in the second column of FIG. 10, the first column of FIG. 10 being the mean gray scale response values shown in FIG. 9 for the seven HP® Scan Jet® scanners. The UMAX®-Power Look® III Scanner is capable of having the gamma value adjusted therein. As such, the gamma value may be changed from 1.5 to 1.0. The gray scale response of the Power Look® III Scanner after changing the gamma value to 1.0 is shown in column three of FIG. 10.

Additionally, a range transform may be conducted after the correction of the gamma value in the UMAX®-Power Look® III Scanner. Upon viewing the first and second columns of FIG. 10, it can be seen that the range of the gray scale response for the UMAX®-Power Look® III Scanner is approximately 0 to 255. In contrast, the range of the gray scale response values for the mean of the HP® Scan Jet® scanners is 4 to 220. The range of the UMAX®-Power Look® III Scanner may be modified by performing the range transform such that the slope of the function between the input and output values is altered to more closely conform to the gray scale response values of the mean of the HP® Scan Jet® scanners. The range transform in the UMAX®-Power Look® III Scanner is not so much of a cutoff of the outer limits of the gray scale response values but can be more accurately thought of as an adjustment in the sensitivity range of the UMAX®-Power Look® III Scanner.

Figure 11:
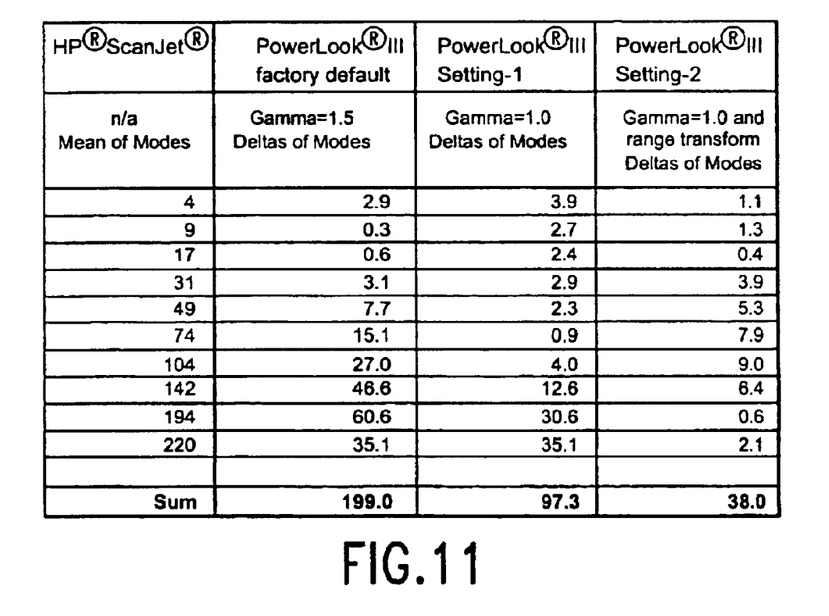
FIG. 11 is a table of the difference of modes between the mean of modes of the HP® Scan Jet® Scanners in FIG. 10 and the three settings of the UMAX®-Power Look® III Scanners of FIG. 10.

By adjusting the gamma value and the slope of the input/output function (range transform), the differences in the modes of the gray scale response values between the UMAX®-Power Look® III Scanner and the seven HP® Scan Jet® scanners are reduced. FIG. 11 shows the differences between the various setting of the Power Look® III Scanner in FIG. 10 and the mean value of the HP® Scan Jet® scanners in FIG. 10. These differences are displayed in the second, third, and fourth columns of FIG. 11. The sum totals of the differences of these three columns are also displayed in FIG. 11.

It can be seen that the change in the gamma value from 1.5 to 1.0 reduces the differences of modes between the UMAX®-Power Look® III Scanner and the seven HP® Scan Jet®) scanners from 199.0 to 97.3. Also, it can be seen that in performing the range transform of the UMAX®-Power Look® III Scanner (after changing the gamma value to 1.0) a further reduction in the differences of modes from 97.3 to 38.0 results. As such, in one exemplary embodiment of the present invention, altering both the gamma value and the slope of the input/output function (range transform) causes the UMAX®-Power Look® III Scanner to exhibit gray scale response values that are closely comparable with a typical HP® Scan Jet® scanner.

Figure 12:
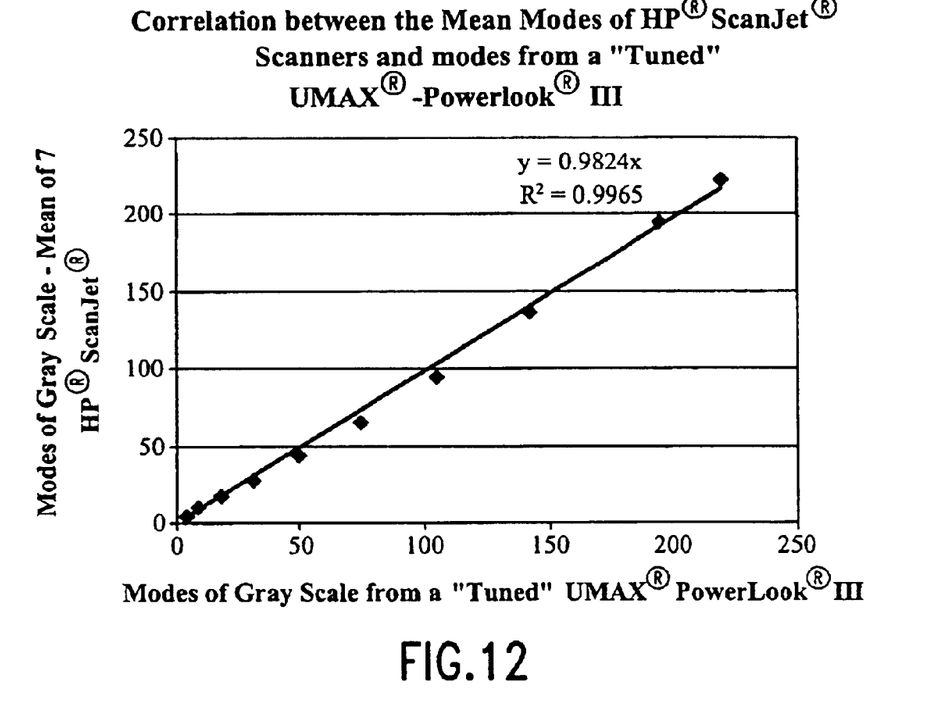
FIG. 12 is a graph of the correlation of modes between the tuned UMAX®-Power Look® III Scanner and the mean of modes of the seven HP® Scan Jet® Scanners.

FIG. 12 shows the correlation of modes between this "tuned" UMAX®-Power Look® III Scanner and the group of seven HP® Scan Jet® scanners. The R square of the correlation between the two groups of modes is 0.9965. Therefore, by adjusting various settings of a second scanner, it is possible to achieve gray scale response values that are closer to a first scanner. Although described as being a non-adjustable first scanner, it is to be understood that in other exemplary embodiments of the present invention, that the first scanner or first group of scanners may be adjustable. Further, if a group of first scanners is used, one or more of the scanners may be adjustable while one or more of the first scanners are also non-adjustable. As such, the present invention is not limited to a first scanner that is non-adjustable and a second scanner that is adjustable.

In other exemplary embodiments of the present invention, only the gamma value may be changed in order to more closely conform the two scanners to one another. Also, in other exemplary embodiments of the present invention, only a range transform may be conducted in order to more closely conform the gray scale responses of the second scanner to the first scanner. Changing both the gamma value and conducting the range transform is only the preferred embodiment of the present invention, and is not the only embodiment of the present invention. It is to be understood that other settings in the second scanner may be modified in order to conform the gray scale response of the second scanner to the first scanner. As such, the present invention includes any adjustment of the second scanner that results in a change in the gray scale response of the second scanner. For instance the contrast, brightness, scan mode, filter id, scan lamp density, rotation, red shadow, green shadow, blue shadow, red highlight, green highlight, blue highlight, balance, red curve, green curve, and/or blue curve of the second scanner may be adjusted in other exemplary embodiments. Further, other adjustments that may be made to the second scanner in order to produce a different gray scale response upon scanning a target are also included in the present invention as is known by those skilled in the art. Therefore, the present invention is not limited to only a gamma value and/or a range transform of the second scanner in order to modify the gray scale response of the second scanner.

Figure 13:
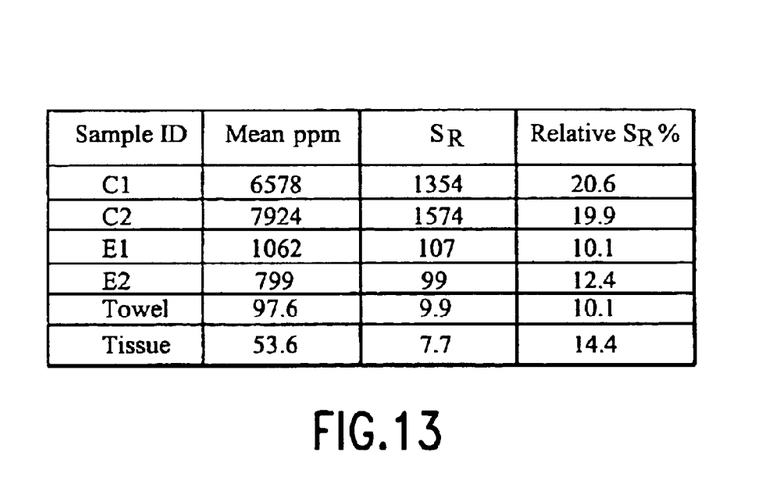
FIG. 13 is a table of dirt count data obtained by seven HP® Scan Jet® Scanners upon scanning different samples.

The adjustment of the gray scale response of the second scanner to more closely match the gray scale response of the first scanner may be validated through test results. FIG. 13 shows a statistical summary of dirt count data that was obtained through measurement by seven different HP® Scan Jet® scanners upon measuring a variety of targets. Targets or sample IDs C1 and C2 are hand sheets that are made of unprocessed recycled fibers with low brightness and many different shades of dirt specks. Targets or sample IDs E1 and E2 are hand sheets that are made from processed recycled fiber with a brightness of approximately 73 gray-scale and relatively fewer dirt specks than the targets or sample IDs C1 and C2. Also tested were a towel and tissue that were both base sheets. The mean parts per million of dirt found in the samples is shown in the second column of FIG. 13. The third and fourth columns of FIG. 13 represent the standard deviation and the relative percentage of standard deviation.

The relative standard deviation percentage is defined as the standard deviation divided by the mean parts per million. Therefore, it is the number shown in column three divided by the number shown in column two. The standard deviation is a measurement of the variations of the test results when the same sample is tested by the different HP® Scan Jet® scanners.

Figure 14:
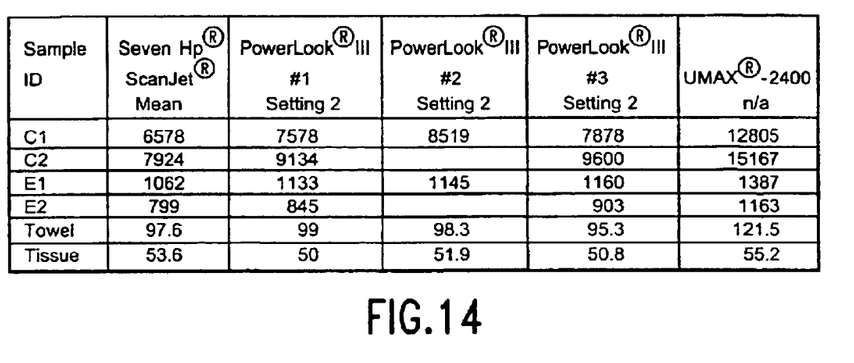
FIG. 14 is a table of dirt count data obtained from seven HP® Scan Jet® Scanners, a UMAX®-2400 Scanner, and three UMAX®-Power Look® III Scanners.

In order to validate the adjustment of the second scanner, three UMAX®-Power Look® III Scanners were used to test the same samples tested by the seven HP® Scan Jet® scanners. The three UMAX®-Power Look® III Scanners were the "tuned" scanners as described above. That is, the gamma value of the three UMAX®-Power Look® III Scanners was 1.0, and a range transform was conducted for each scanner. In essence, the three UMAX®-Power Look® III Scanners had setting 2 as shown in the fourth column of FIG. 10. The result of the dirt measurements of the three UMAX®-Power Look® III Scanners are shown in the third, fourth, and fifth columns in FIG. 14. By way of comparison, an untunable UMAX®-2400 Scanner was also used to test the same samples. The results of the UMAX®-2400 Scanner are shown in the sixth column of FIG. 14. The dirt test measurement data shown in FIG. 14 was used to calculate a Z-score measurement. The Z-score is a measurement of the closeness of a single measurement to a group of data. In the present case, the Z-scores are used to measure the effectiveness of the scanner adjustment. The Z-score may be calculated by the following equation, where SR is the standard deviation:

$$Z\text{-score} = \frac{[(\text{measurement by a UMAX®-Power Look® III Scanner}) - (\text{mean of the measurements of the seven HP® Scan Jet® Scanners})]}{S_R(\text{seven HP® Scan Jet® Scanners})}$$

Figure 15:
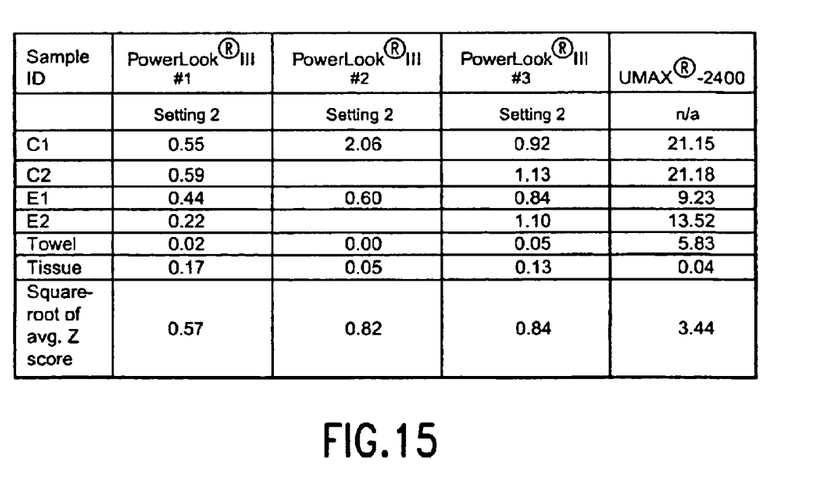
FIG. 15 is a table of Z-scores of a UMAX®-2400 Scanner and three UMAX®-Power Look® III Scanners.

The individual Z-scores for each measurement by the three UMAX®-Power Look® III Scanners having the aforementioned adjustment is shown in FIG. 15. Also shown is the individual Z-scores for the measurements taken by the UMAX®-2400 Scanner. The values in FIG. 15 are the Z-scores squared. This was done in order to eliminate negative values. The square root of the average Z-score is also shown in FIG. 15. The square root of the average Z-score may be defined as:

$$\text{Square root of average } Z\text{-score} = \sqrt{(\text{mean } Z\text{-scores from one scanner})}$$

Figure 16:
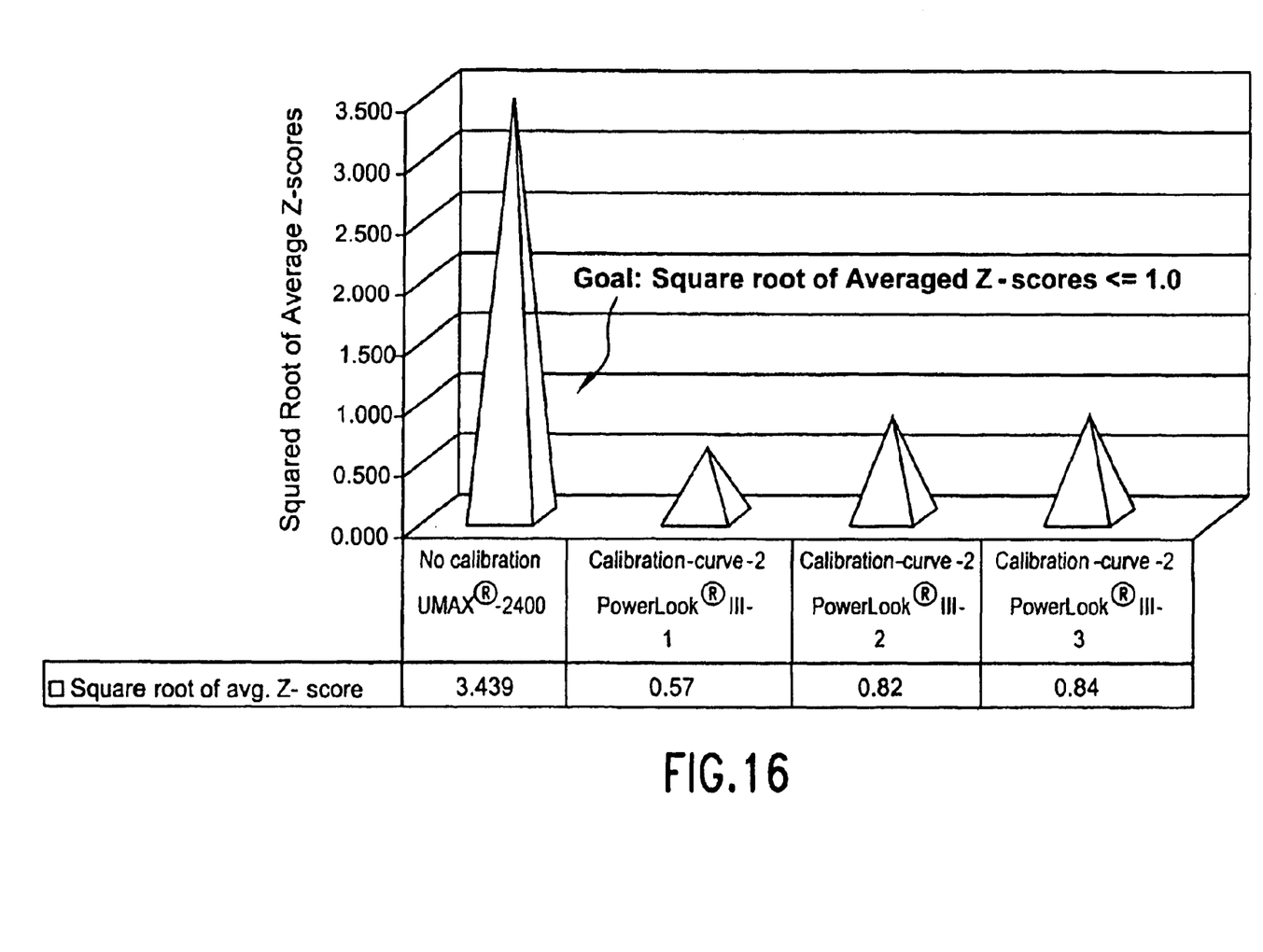
FIG. 16 is graph of the effectiveness of the reproducibility of dirt tests by different scanners.

The smaller the Z-score, the closer the measurement is to the mean of the other group of data. When the Z-score is less than 1.0, this indicates that the measurement evaluated is within a one-sigma range of the other group of data. As can be seen, the UMAX®-2400 Scanner has a large square root of average Z-scores. This is due to the inability of the UMAX®-2400 Scanner to be adjusted in order to more closely conform the gray scale response of the UMAX®-2400 Scanner to the seven HP® Scan Jet® Scanners. However, the UMAX®-Power Look® III Scanners are able to be adjusted, and the square root of the average Z-scores of these scanners can be made to be less than 1.0. FIG. 16 shows a graph of the square root of the average Z-scores for the aforementioned scanners.

FIG. 16 shows three UMAX®-Power Look® III Scanners having the "setting 2". Although these three scanners have the same settings, they are three physically different scanners and therefore produced slightly different results. The reason for the different results may be due to the factors discussed above, that is variation in light intensity and variation in movement control of the scanning head.

In one exemplary embodiment of the present invention, the adjustable scanner employs Magic Scan control software which communicates with the scanner. The Magic Scan software may be provided with an initiation file that records the settings of the scanner. This initiation file contains the gamma value settings along with the range transform settings and other parameters that determine how the scanner will receive an output data. Upon adjusting the scanner, the initiation file may be modified so that it contains the new settings for the values that were adjusted in order to more closely conform the second scanner to the first scanner. For instance, the gamma values and/or the range transform in the initiation file may be modified and saved. Therefore, upon further scanning at different times, the initiation file will be properly set up in order to allow for the adjustment and to eliminate the need for the user to adjust each time a dirt count measurement is desired. Additionally, the initiation file may be modified in one scanner and PC configuration and sent to different scanners so that these different scanners do not have to have any further adjustments made therein. However, the present invention also includes exemplary embodiments where the initiation file is not modified and saved. For instances, the present invention includes exemplary embodiments where an adjustment of the gray scale response of a scanner is made each time a dirt count measurement is desired.

Although described as being input into an initiation file, other scanners and software will employ differently named files and/or mechanisms in order to record and save the scanner settings. As such, the present invention is not limited to the modification and storage of an initiation file.

Also, although the results of the adjustment may be validated, the present invention is not limited to a validation step. As such, the present invention includes exemplary embodiments wherein a step of validation of the dirt count measurements between the first and second scanners is not needed.

It should be understood that the present invention includes various modifications that can be made to the exemplary embodiments of the method of adjusting the gray scale response to more closely correlate scanner based image analysis systems as described herein as come within the scope of the appended claims and their equivalents.

What is claimed is:

1. A method of adjusting the gray scale response of a first scanner and a second scanner so that the two gray scale responses more closely match one another, comprising the steps of:
   providing a plurality of first scanners having a gray scale response upon scanning a target;
   providing a second scanner having a gray scale response upon scanning said target that is adjustable;
   measuring said gray scale response of said plurality of first scanners upon scanning said target;
   measuring said gray scale response of said second scanner upon scanning said target; and
   adjusting said gray scale response of said second scanner to more closely match the mean of said gray scale response of said plurality of first scanners.

2. The method of claim 1, wherein said plurality of first scanners have a factory set gray scale response that is not adjustable.

3. The method of claim 1, wherein said second scanner has a maximum dynamic range that is greater than or equal to 3.4.

4. The method of claim 1, wherein: said step of measuring said gray scale response of said plurality of first scanners upon scanning said target includes measuring at least one mode of said gray scale response of said plurality of first scanners; and wherein said step of measuring said gray scale response of said second scanner upon scanning said target includes measuring at least one mode of said gray scale response of said second scanner.

5. The method of claim 1, wherein said target is a ten-step gray scale target.

6. The method of claim 1, wherein said step of adjusting comprises adjusting a gamma value of said second scanner such that said gray scale response of said second scanner more closely matches the mean of said gray scale response of said plurality of first scanners.

7. The method of claim 1, wherein said step of adjusting comprises adjusting a range transform of said second scanner such that said gray scale response of said second scanner more closely matches the mean of said gray scale response of said plurality of first scanners.

8. The method of claim 1, wherein said second scanner has an initiation file, and further comprising the step of modifying said initiation file of said second scanner after said adjusting step such that adjustments resulting from said adjusting step are retained in said initiation file of said second scanner.

9. A method of adjusting the gray scale response of a second scanner to more closely match the gray scale response of a plurality of first scanners, comprising the steps of:

providing a plurality of first scanners, said first scanners having a gray scale response upon scanning a target;

providing a second scanner having a gray scale response upon scanning said target that is adjustable;

scanning said target by said plurality of first scanners;

scanning said target by said second scanner;

measuring a plurality of modes of said gray scale responses of said plurality of first scanners upon scanning said target by said plurality of first scanners;

measuring a plurality of modes of said gray scale response of said second scanner upon scanning said target by said second scanner;

calculating the mean of said plurality of modes of said gray scale responses of said plurality of first scanners; and adjusting said gray scale response of said second scanner to more closely match said gray scale responses of said plurality of first scanners such that the sum of the differences between said plurality of modes of said gray scale response of said second scanner and said mean of said plurality of modes of said gray scale responses of said plurality of first scanners is reduced after adjusting.

10. The method of claim 9, wherein said gray scale responses of said plurality of first scanners are factory set and non-adjustable.

11. The method of claim 9, wherein said second scanner has a maximum dynamic range that is greater than or equal to 3.4.

12. The method of claim 9, wherein said target is a 10-step gray scale target.

13. The method of claim 9, wherein said step of adjusting includes adjusting a gamma value of said second scanner such that said gray scale response of said second scanner more closely matches said gray scale responses of said plurality of first scanners.

14. The method of claim 13, wherein said step of adjusting includes adjusting a range transform of said second scanner such that such said gray scale response of said second scanner more closely matches said gray scale responses of said plurality of first scanners.

15. The method of claim 9, wherein said second scanner has an initiation file, and further comprising the step of modifying said initiation file of said second scanner after said adjusting step such that adjustments resulting from said adjusting step are retained in said initiation file of said plurality of first scanners.

16. A method of adjusting the gray scale response of a scanner, comprising:

providing a plurality of first scanners each having a gray scale response upon scanning a target, said gray scale responses of said first scanners being factory set and non-adjustable;

providing a second scanner having an adjustable gray scale response upon scanning said target, said second scanner having a maximum dynamic range greater than or equal to 3.4;

providing a target, said target being a ten-step gray scale target;

scanning said target by said plurality of first scanners;

scanning said target by said second scanner;

measuring a plurality of modes of said gray scale responses of said plurality of first scanners;

calculating the mean of said plurality of modes of said gray scale responses of said plurality of first scanners;

measuring a plurality of modes of said gray scale response of said second scanner;

adjusting a gamma value of said second scanner such that the sum of the differences between said plurality of modes of said gray scale response of said second scanner and said mean of said plurality of modes of said gray scale responses of said plurality of first scanners is reduced after adjusting; and adjusting a range transform of said second scanner, after said step of adjusting said gamma value, such that the sum of the differences between said plurality of modes of said gray scale response of said second scanner, and said mean of said plurality of modes of said gray scale responses of said plurality of first scanners is reduced after adjusting.

17. A manufacturing process wherein a manufactured product is scanned by a plurality of gray scale scanners, said process comprising:

scanning said product by a plurality of first scanners;

scanning said product by a second scanner;

measuring a plurality of modes of gray scales responses of said plurality of first scanners upon scanning said product by said plurality of first scanners;

measuring a plurality of modes of gray scale response of said second scanner upon scanning said product by said second scanner;

adjusting said gray scale response of said second scanner to more closely match said gray scale responses of said plurality of first scanners;

scanning said product by said second scanner after said adjusting step;

calculating the dirt count of said product by using data obtained from the step of scanning said product by said second scanner after said adjusting step; and adjusting the manufacturing process in response to the dirt count of said product.

18. The manufacturing process of claim 17, wherein said plurality of first scanners having a factory set gray scale response that it not adjustable.

19. The manufacturing process of claim 17, wherein said step of adjusting includes adjusting a gamma value of said second scanner such that said gray scale response of said second scanner more closely matches said gray scale responses of said plurality of first scanners.

20. The manufacturing process of claim 17, wherein said second scanner has a maximum dynamic range that is greater than or equal to 3.4.

21. The manufacturing process of claim 17, wherein said second scanner has an initiation file, and further comprising the step of modifying said initiation file of said second scanner after said adjusting step such that adjustments resulting from said adjusting step are retained in said initiation file of said second scanner.

* * * * *